H. CHRISTENSEN.
COMBINED CHURN AND BUTTER WORKER.
APPLICATION FILED APR. 19, 1920.
1,367,732.
Patented Feb. 8, 1921.
2 SHEETS—SHEET 1.
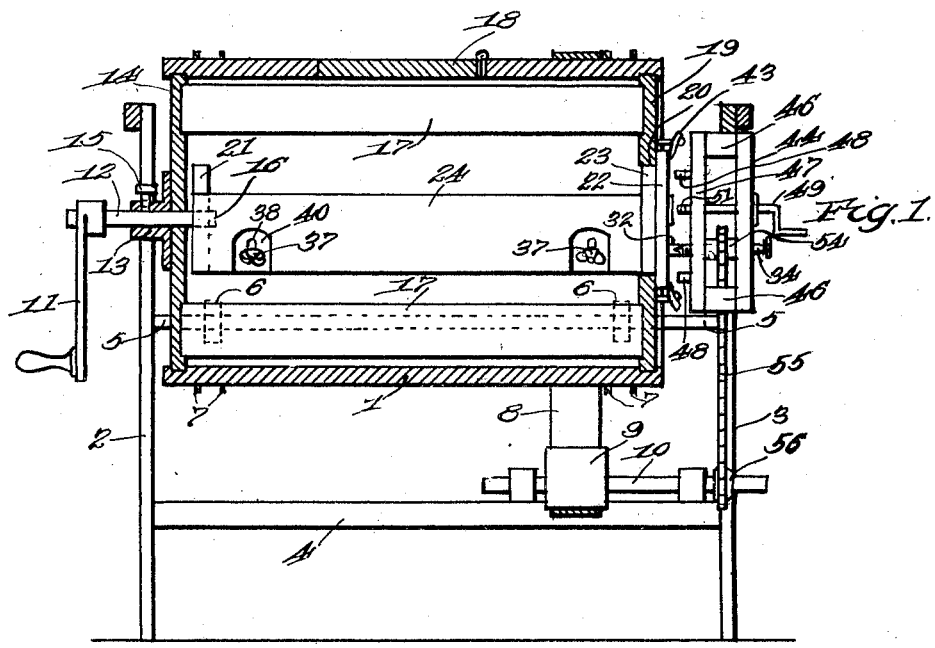
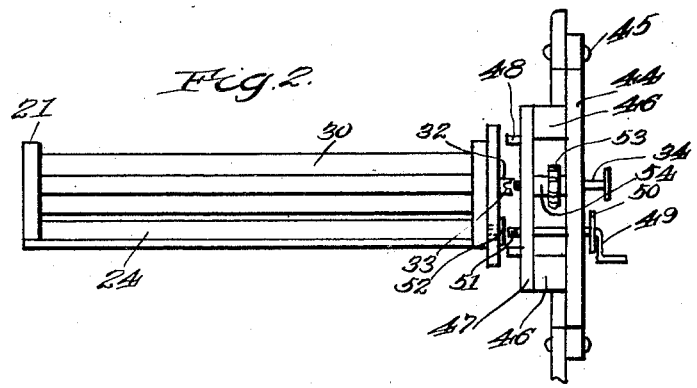
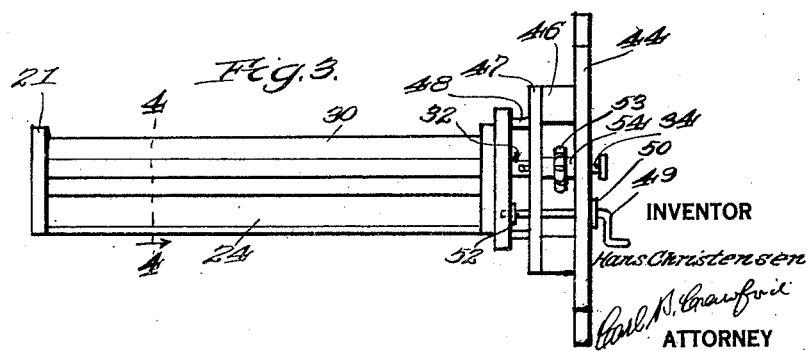
INVENTOR
Hans Christensen
ATTORNEY H. CHRISTENSEN.
COMBINED CHURN AND BUTTER WORKER.
APPLICATION FILED APR. 19, 1920.
1,367,732.
Patented Feb. 8, 1921.
2 SHEETS—SHEET 2.
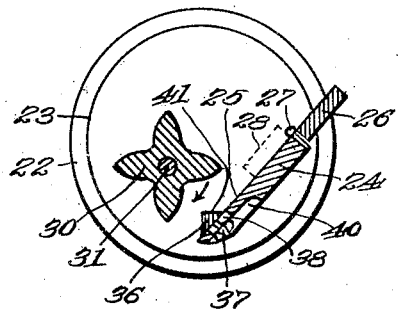
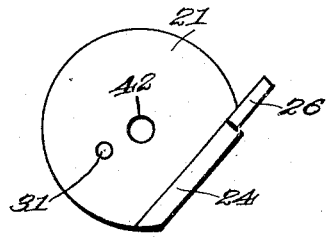
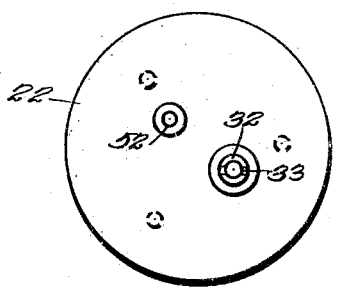
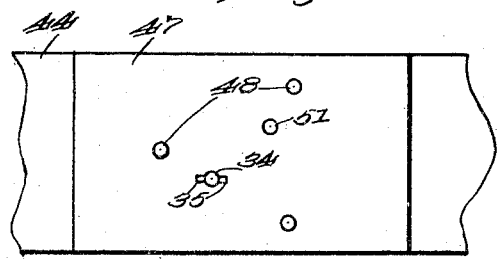
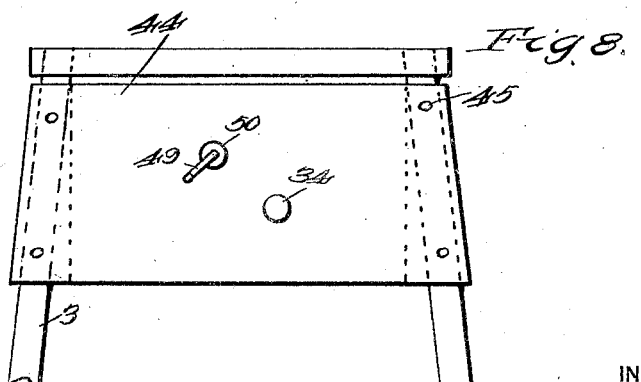
INVENTOR
Hans Christensen
BY
Carl M. Crawford
ATTORNEY

UNITED STATES PATENT OFFICE.

HANS CHRISTENSEN, OF SPOKANE, WASHINGTON.

COMBINED CHURN AND BUTTER-WORKER.

1,367,732.  Specification of Letters Patent.  Patented Feb. 8, 1921.

Application filed April 19, 1920. Serial No. 375,071.

*To all whom it may concern:*

Be it known that I, HANS CHRISTENSEN, a citizen of the United States, residing at Spokane, in the county of Spokane and State of Washington, have invented new and useful Improvements in Combined Churns and Butter-Workers, of which the following is a specification.

This invention relates to improvements in devices for churning and butter working and it has to do more particularly with a structure of this character involving a rotatable barrel having a series of slats internally disposed therein for the purpose of carrying up the material and then discharging the same upon an axially disposed kneading means.

Substantially the foregoing construction is shown in my pending application filed July 23, 1919, Serial No. 312,811. The present invention has to do more particularly with an improved form of kneading means, *per se*, and also in combination in a novel manner with the barrel so that the device may be used either as a churn or as a butter worker.

My improved kneading means comprises coacting movable and fixed parts, the fixed part or portion thereof being capable of being extended to catch a relatively greater amount of the descending cream or rather the butter. A further feature consists in means for restricting discharge from between the coacting parts so as to conform the butter worker to approximately the amount of material being worked irrespective of the size of the churn.

A further feature of my invention relates to an improved manner of mounting the kneading means in the churn barrel whereby during the churning operation, said means may be clamped to and will function to close the barrel against the escape of the cream, and whereby during the butter working operation, the kneading means will be shifted out of rotative connection with the barrel and into driven relation for operation of a part of the kneading means, the latter being anchored in this adjustment against bodily rotation with the churn, and all of these adjustments being effected without either opening the churn or bodily removing the kneading means from the churn.

My invention has other objects and features which will be more fully described in connection with the accompanying drawings and which will be more particularly pointed out in and by the appended claims.

In the drawings:—

Figure 1, is a vertical sectional view of the device of my invention showing the kneading means locked to the barrel for churning purposes.

Fig. 2, is a plan view of the kneading means in the same adjustment.

Fig. 3, is a plan view of the kneading means in anchored relation against bodily rotation and connected in driven relation as regards one portion thereof.

Fig. 4, is a sectional view on line 4—4 of Fig. 3.

Fig. 5, is an end view looking from the left of Fig. 3.

Fig. 6, is an end view looking at the kneading means from the right of Fig. 3.

Fig. 7 is a face view of a supporting and driving structure looking in the direction of the arrow in Fig. 2.

Fig. 8 is a view of the same looking in the opposite direction, or to the left of Fig. 2 as indicated by the arrow.

Like characters of reference designate similar parts throughout the different figures of the drawings.

The barrel 1 is rotatively mounted upon a frame structure having end A-frame members 2 and 3 which are connected by horizontal frame member 4. Fixed shafts 5 also connects said frame members and are provided with rollers 6 which run in tracts 7 on the periphery of the barrel 1 whereby the barrel 1 is rotatively mounted. A belt 8 extends about the barrel and is trained over a pulley 9 on driving shaft 10. If the barrel 1 is to be power driven, power may be applied to shaft 10 in any desired manner. If the barrel 1 is to be manually rotated, a crank 11 is employed. The crank shaft 12 thereof extends through a fitting 13 which is secured rigidly to the closed head 14 of the barrel 1. A set screw 15, in said fitting, may serve to secure the crank shaft 12 to the barrel 1 when the latter is to be manually rotated. Shaft 12 extends inwardly of the head 14, as indicated at 16, to function as one support for my improved kneading means, as will later appear. The barrel 1 has a plurality of slats 17 which function to carry up the material and then discharge the same downwardly and substantially axially of the barrel in a manner to be caught by my improved kneading means during the operation of working the butter. A door 18 provides for access and inspection to and of the barrel 1. The opposite end 19, of the barrel 1, will hereinafter be turned the open head end, the same having an opening 20.

All of the foregoing, which is essential to an understanding to the present invention, has been disclosed in my above mentioned prior application. I will next describe that portion of the apparatus which constitutes the present improvement.

My improved kneading means is mounted upon a supporting head 21 and a closing head 22 which latter is also provided with a supporting portion 23. Connected with said portions 21 and 23 is an inclined kneading board 24, the position of which is clearly shown in Fig. 4 as being inclined to a vertical line intersecting the axis of rotation of said supporting heads, said board having a receiving surface 25. The manner in which the board 24 is connected to head 21 is clearly shown in Fig. 5. Said board is provided with an extension 26 which serves to lengthen and also widen the receiving surface or face 25. Said extension is shown hinged at 27, to the board 24 so that said extension is free to be folded inwardly as indicated at 28. In the churning operation, as will later appear, neither the board nor the extension will actively function but the extension is important for many reasons among which is that utility of a relatively large sized churn for working a relatively small amount of butter. This results from the fact that a greater amount of the butter will be caught in its descent from the slats 17 by reason of the increased area of the board 24. In its folded or retracted position, as shown in dotted lines, the extension serves to restrict the space between the coacting kneading members thereby increasing the kneading action thereof. A fluted or bladed kneading roller 30 is mounted upon a spindle 31 which is suitably journaled in heads 21 and 22. The driven end of the spindle 31 is provided with a socket 32 having notches 33 which forms a coupling member for coaction with a sprocket spindle 34 having coupling stems 35 which are adapted for engagement with the socket 32.

Now it will be clear that as the blades of the roller approach the surface 25, a kneading action on the interposed material will result. However, there may be a too free discharge of the material from between the board and the roller, and to correct this, I employ means which may be in the form of a restricting rail 36, of triangular cross section and which may be adjusted to various positions up or down on the surface 25 by means of winged nuts 37. Slots 38 in the board 24 provide for movement of the bolts 39 and I preferably notch out the bottom of the board, as at 40. The triangular form of rail 36 provides a surface 41 which is presented toward the descending blades of the roller 30 thereby affording a very effective kneading action.

Reference will next be made to the manner in which the kneading device is mounted in the barrel 1.

The head 21 is provided with a bore 42 into which the end 16 of shaft 12 projects thereby rotatively supporting one end of the kneading device. In the churning operation the supporting portion 23 fits in the opening 20 and the part 22 overlaps the latter to close the open head end. Rotating cam clamps 43 serve to secure the head 22 to the head 19 so that the kneading device will rotate with the barrel 1. Of course suitable gaskets or packing may be interposed to effect a liquid tight joint and seal the barrel 1 during the churning operation. Thus during the churning operation, the kneading device will be in the adjustment shown in Figs. 1 and 2 and of course the roller 30 and the board 24 will only function incidently to the fact that the barrel 1 is rotated.

After the churning operation has been finished, and it is desired to work the butter, then the kneading device is shifted into anchorage against a frame structure and the movable part or roller 30 is connected into driven adjustment in a manner which I will next describe in detail.

A driving and anchorage frame is mounted upon the end A-frame member 3 by means of one of its members 44 and fastening devices 45. Said structure comprises a frame including corner blocks 46 and an inside frame member 47 which is parallel with the outside frame member 44. This frame may be detachably secured to the A-frame member 3 by said fastening devices 45, the importance of which will later appear. Three anchorage studs 48 are mounted upon member 47 and are adapted for engagement by the right hand face of head 22. An adjusting crank 49 is journaled in the frame rotatively and against longitudinal movement in one direction by means of collar 50 and the inner end of said crank 49 is threaded at 51. A threaded socket 52, in head 22, is adapted to receive the threaded end 51. As the crank 49 is turned, after being longitudinally shifted to insert the end 52, the kneading device will be slightly displaced horizontally from the position shown in Figs. 1 and 2 to the position shown in Fig. 3. The crank will be turned until the head 22 is in very firm engagement with the studs 48 thereby locking the kneading device against rotation with the barrel. Of course it will be understood that the cam fasteners 43 will have previously been released to permit such adjustment of the kneading device.

It will also be clear that the function of the crank 49 is two-fold, namely, it holds the kneading device against the studs 48 to anchor the former, and after it has been inserted in the socket 52 it necessarily disposes the kneading device in a proper butter working position as shown in Fig. 4.

A sprocket wheel 53 is mounted upon a sleeve 54 between members 44 and 47, upon the sprocket spindle 34 having coupling stems 35. Now during the churning operation the spindle 34 will be out of coupling engagement with socket 32 but in the butter working operation, which adjustment is shown in Fig. 3, the spindle 34 will be shifted longitudinally to the left for connection with the socket 32. Of course the spindle 34 will be now rotatively connected with sleeve 54. A chain 55 is trained over sprocket 53 and a sprocket 56 on shaft 10.

Of course when it is desired to clean the churn, taking the same apart, then the fastening devices 45 will be released to take off said anchorage frame whereby the kneading device may be axially withdrawn through the opening 20 and later again inserted therethrough. However, this feature has been claimed in my prior application, and the feature that I now wish to emphasize is that my present kneading device may be shifted from a churning to a butter working position, and vice versa without either opening the barrel 1 or removing the kneading means therefrom.

It is believed that my invention will be fully understood from the foregoing description, and I do not wish to be limited thereto except for such limitations as the claims may import.

I claim:

1. In a churn or butter worker, a rotatively mounted barrel, and kneading means for the interior of said barrel and movable independently of the barrel comprising a plane surface member and a rotatable member coacting with said plane surface member.

2. In a churn or butter worker including a barrel, characterized by kneading means in the barrel composed of fixed and rotatable members coacting with each other and relatively movable independently of the barrel.

3. In a churn or butter worker including a barrel, characterized by an inclined kneading board and a fluted roller coacting with one inclined surface of said board said board being mounted independently of the barrel.

4. In a churn or butter worker including a barrel, characterized by an inclined kneading board having an inclined surface for receiving the material to be kneaded and said board having an adjustable extension for enlarging its receiving surface, and a fluted roller coacting with said kneading surface.

5. In a churn or butter worker including a barrel, characterized by an inclined kneading board mounted independently of the barrel and having an inclined surface for receiving the material to be kneaded, and a fluted kneading roller extending along side and in spaced relation to said receiving surface and having its axis of rotation above the bottom of said kneading surface.

6. In a churn or butter worker including a barrel, characterized by an inclined kneading board mounted independently of the barrel and having an inclined surface for receiving the material to be kneaded, a fluted kneading roller extending along side and in spaced relation to said receiving surface and having its axis of rotation above the bottom of said kneading surface, and means for restricting the space between said surface and roller.

7. In a churn or butter worker including a barrel, characterized by an inclined kneading board mounted independently of the barrel and having an inclined surface for receiving the material to be kneaded, a fluted kneading roller extending along side of and in spaced relation to said receiving surface and having its axis of rotation above the bottom of said kneading surface, and means adjustably mounted on said board for varying the space between said kneading surface and roller.

8. In a combined churn or butter worker, a barrel, having material lifting and discharging slats, a frame mechanism rotatively supporting said barrel, kneading means disposed in said barrel, devices for securing said kneading means to said barrel during the churning operation or releasing said kneading means from attachment to said barrel during the butter working operation without removing said kneading means from the barrel, and means for holding said kneading means against movement with the barrel and connecting said kneading means for driven operation without removing said kneading means from the barrel.

9. In a combined churn or butter worker, a barrel having material lifting and discharging slats, a frame mechanism rotatively supporting said barrel, kneading means disposed in said barrel, and mechanism carried by said frame for adjusting said kneading means from the exterior of the barrel.

10. In a combined churn or butter worker, a barrel having material lifting and discharging slats, a frame mechanism rotatively supporting said barrel, kneading means rotatively disposed in said barrel and mechanism on said frame for gripping said kneading means to hold the same against bodily rotation in said barrel and connecting a portion of said means into an adjustment of driven relation.

11. In a combined churn or butter worker, a barrel having material lifting and discharging slats having an open head end, a frame mechanism rotatively supporting said barrel, kneading means having one end rotatively mounted in said barrel and having a head adapted to be mounted in the open head end of said barrel to close the latter, means for securing said head to the barrel in liquid tight engagement therewith, means on said frame for shifting said kneading means longitudinally in said barrel into anchorage with the frame to hold said kneading means against bodily rotation with said barrel, and means for connecting up a movable portion of said kneading means in driven relation independently of rotation of said barrel.

12. In a combined churn and butter worker, a main frame, a barrel rotatively supported on said frame and having an open head end, a kneading means in said churn and having a head for closing the open head end of said barrel and provided with a movable kneading member, an anchorage frame mounted on said main frame and having anchoring studs and a driving spindle, and means mounted on said anchorage frame for shifting said kneading means into anchorage engagement with said studs and holding said kneading means in a predetermined position, said driving spindle being adjustable into coupling relation with the movable kneading member to drive the latter after said anchorage frame means has anchored said kneading means.

13. In a combined churn and butter worker, a main frame, a barrel rotatively supported on said frame and having an open head end, a kneading means in said churn provided with a movable kneading member, an anchorage frame mounted on said main frame and having a driving spindle, means on said anchorage frame for holding said kneading means non-rotatable and in a predetermined position for drivingly connecting the movable member of said kneading means.

In testimony that I claim the foregoing as my own, I hereby affix my signature.

HANS CHRISTENSEN.